United States Patent
Sorensen et al.

(10) Patent No.: US 7,500,910 B2
(45) Date of Patent: Mar. 10, 2009

(54) DEVICE AND METHOD FOR CLAMPING AND CUTTING

(75) Inventors: William R. Sorensen, Blue Springs, MO (US); Michael S. Haines, Lenexa, KS (US); Joshua Gillespie, Gladstone, MO (US); Antoine J. H. Winkelmolen, Shawnee, KS (US)

(73) Assignee: Johnson Food Equipment, Inc., Kansas City, KS (US)

( * ) Notice: Subject to any disclaimer, the term of this patent is extended or adjusted under 35 U.S.C. 154(b) by 0 days.

(21) Appl. No.: 11/834,109

(22) Filed: Aug. 6, 2007

(65) Prior Publication Data
US 2009/0042497 A1 Feb. 12, 2009

(51) Int. Cl.
*A22B 5/18* (2006.01)
(52) U.S. Cl. .................................. 452/117
(58) Field of Classification Search ............ 452/106, 452/107, 111, 115, 123, 118, 134, 160
See application file for complete search history.

(56) References Cited

U.S. PATENT DOCUMENTS

| | | | |
|---|---|---|---|
| 4,019,222 A * | 4/1977 | Scheier et al. | 452/117 |
| 4,561,148 A * | 12/1985 | Bonuchi et al. | 452/117 |
| RE32,402 E * | 4/1987 | Graham et al. | 452/117 |
| 5,071,388 A | 12/1991 | Lindert | |
| 5,178,578 A | 1/1993 | Simmons | |
| 5,273,485 A | 12/1993 | Hegelmann | |
| 5,545,083 A | 8/1996 | Bargele | |
| 5,549,521 A * | 8/1996 | van den Nieuwelaar et al. | 452/118 |
| 5,597,350 A | 1/1997 | Hunking | |
| 5,618,230 A | 4/1997 | Bargele | |
| 5,890,956 A | 4/1999 | Habenicht | |
| 5,924,918 A | 7/1999 | Wagner | |
| 6,004,199 A | 12/1999 | Habenicht | |
| 6,010,398 A | 1/2000 | Mente | |
| 6,152,816 A * | 11/2000 | van den Nieuwelaar et al. | 452/177 |
| 6,176,772 B1 | 1/2001 | Hazenbroek | |
| 6,319,110 B1 | 11/2001 | Peters | |
| 6,364,758 B1 * | 4/2002 | Nielsen et al. | 452/117 |
| 6,398,636 B1 | 6/2002 | Jansen | |
| 6,612,919 B2 | 9/2003 | Jansen | |
| 6,811,478 B2 * | 11/2004 | van den Nieuwelaar et al. | 452/117 |

* cited by examiner

*Primary Examiner*—Thomas Price
(74) *Attorney, Agent, or Firm*—Spencer Fane Britt & Browne LLP

(57) ABSTRACT

A device (10) and method for clamping or otherwise securing an esophagus between the crop and certain internal organs, including the viscera, and substantially simultaneously cutting or otherwise separating, or weakening for subsequent predictable separation, the esophagus at or near the clamped location, thereby avoiding pulling apart the crop and the resulting contamination of the carcass.

20 Claims, 7 Drawing Sheets

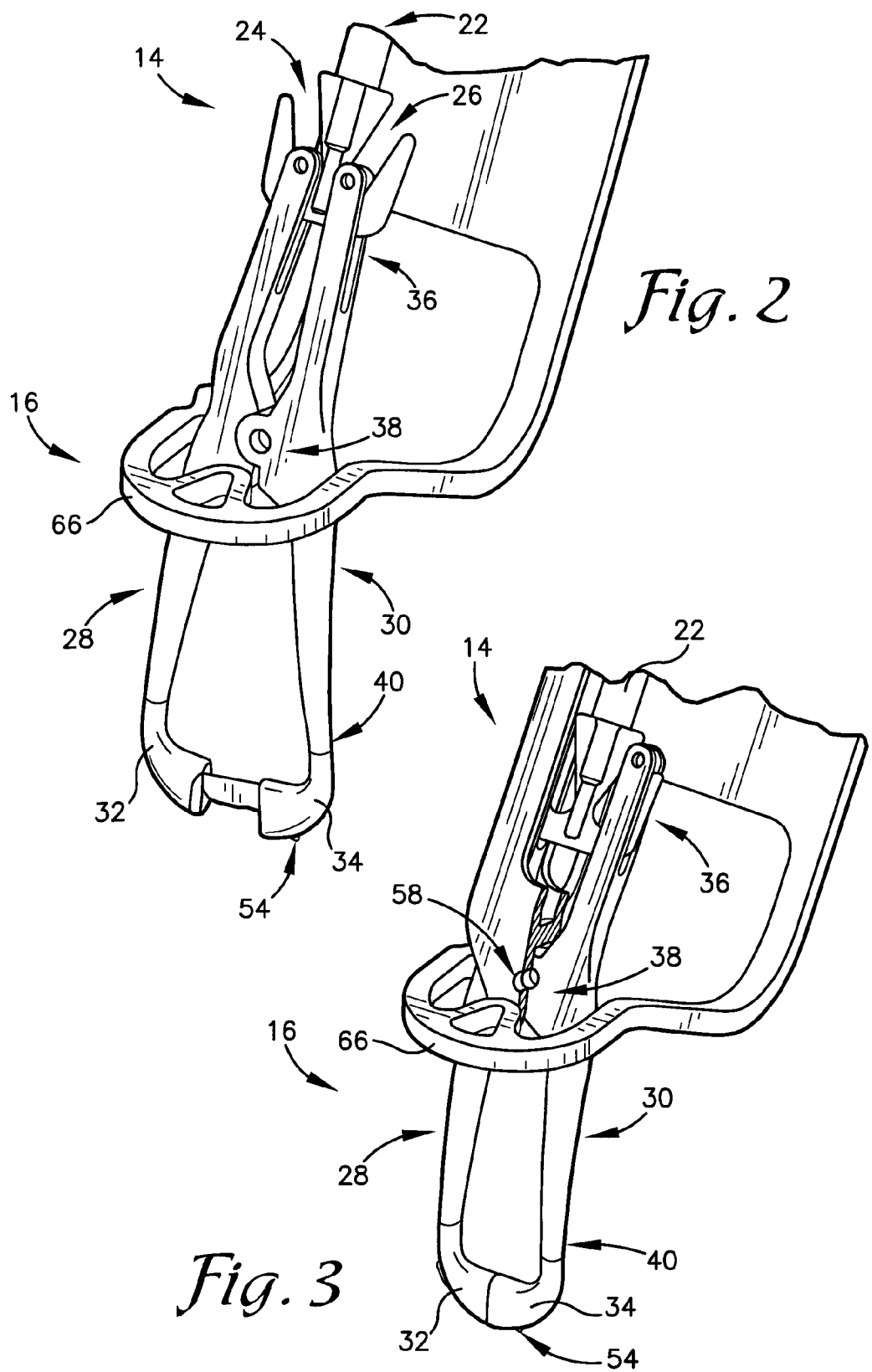

DEVICE AND METHOD FOR CLAMPING AND CUTTING

FIELD OF THE INVENTION

The present invention relates to devices and methods for processing carcasses, particularly poultry carcasses, including removing or preparing to remove internal organs. More specifically, the present invention concerns a device and method for clamping or otherwise securing an esophagus between a crop and certain internal organs, including the viscera, and substantially simultaneously cutting or otherwise separating, or weakening for subsequent predictable separation, the esophagus at or near the clamped location.

BACKGROUND OF THE INVENTION

In the processing of carcasses, particularly poultry carcasses, one processing operation involves removing various internal organs from, i.e., eviscerating, the carcass. In a poultry carcass, these internal organs may include, for example, the white gut, the proventriculus, the viscera parts, the gizzard, and the connection to the crop. Typically, this is accomplished by entering the carcass through a rear opening, clamping the esophagus between the crop and internal organs, and pulling the esophagus and internal organs out of the carcass via the rear opening such that the esophagus separates due to the strain, i.e., is pulled apart, into two distinct parts, with one part remaining within the carcass. Unfortunately, this can produce unpredictable results.

The crop is an enlargement of the esophagus which holds recently eaten food for subsequent slow release into the digestive system. Ideally, the aforementioned internal organs are removed via the rear opening while the crop remains intact within the carcass so that it can be subsequently removed in a more sanitary manner through the neck by a different machine which is sometimes referred to as a "cropper". It is also acceptable if the intact crop is removed with the esophagus.

It sometimes happens, however, that the strain of pulling the esophagus apart results in the crop being pulled apart as well, thereby spilling its contents into and contaminating the carcass. Using prior art machinery, it is roughly estimated that approximately between 20% and 50% of crops are pulled apart, which can lead to various problems. One such problem is that the "cropper" machine, being designed to engage and remove intact crops, can experience difficulty engaging and removing broken crops. Another such problem is that the release of bacteria and partially digested food from the broken crops can significantly increase the microbial loading of the carcasses. If inspectors find too many broken crops, or if microbial testing reveals microbial loads that are too high, the processing line may be slowed or stopped to address the problem. It will be appreciated that such delays and interruptions can be costly.

SUMMARY OF THE INVENTION

The present invention provides a device and method for clamping or otherwise securing an esophagus between a crop and certain internal organs, including the viscera, and substantially simultaneously cutting or otherwise separating, or weakening for subsequent predictable separation, the esophagus at or near the clamped location, thereby avoiding pulling apart the crop and the resulting contamination of the carcass.

Broadly, the device comprises an actuator assembly; a linkage assembly; and a clamping and cutting assembly. The actuator assembly provides actuation motion which ultimately actuates the clamping and cutting assembly. The linkage assembly translates, or conditions, the actuation motion provided by the actuator assembly to accomplish actual actuation of the clamping and cutting assembly. The clamping and cutting assembly actuates to substantially simultaneously clamp and cut the esophagus. The clamping and cutting assembly includes opposed first and second arms and opposed first and second jaws. The first and second arms transfer the actuation motion from the linkage assembly to the first and second jaws, respectively. The first jaw presents a first clamping surface, a cutting element, and a first portion of a guide element. The second jaw presents a second clamping surface and a second portion of the guide element. The first and second clamping surfaces cooperate to secure the esophagus, the cutting element substantially simultaneously cuts the esophagus, and the first and second portions of the guide element cooperate to ensure proper alignment of the jaws during clamping and cutting.

These and other novel features of the present invention are described in more detail in the section titled DETAILED DESCRIPTION OF THE PRESENT INVENTION, below.

BRIEF DESCRIPTION OF THE DRAWINGS

A preferred embodiment of the present invention is described in detail below with reference to the attached drawing figures, wherein:

FIG. 2 is a fragmentary isometric view of a clamping and cutting assembly portion of the device of FIG. 1, wherein a support structure portion has been removed and the clamping and cutting assembly is shown in an open position;

FIG. 3 is a fragmentary isometric view of the clamping and cutting assembly of FIG. 1, wherein the support structure is shown broken away and the clamping and cutting assembly is shown in a closed position;

DETAILED DESCRIPTION OF THE INVENTION

With reference to the figures, a combined clamping and cutting device 10 and method is herein described, shown, and otherwise disclosed in accordance with a preferred embodiment of the present invention. Broadly, the device 10 and method allow for clamping or otherwise securing an esophagus between a crop and certain internal organs, including the viscera, and substantially simultaneously cutting or otherwise separating, or weakening for subsequent predictable separation, the esophagus at or near the clamped location, thereby avoiding pulling apart the crop and the resulting contamination of the carcass.

Figure 1:
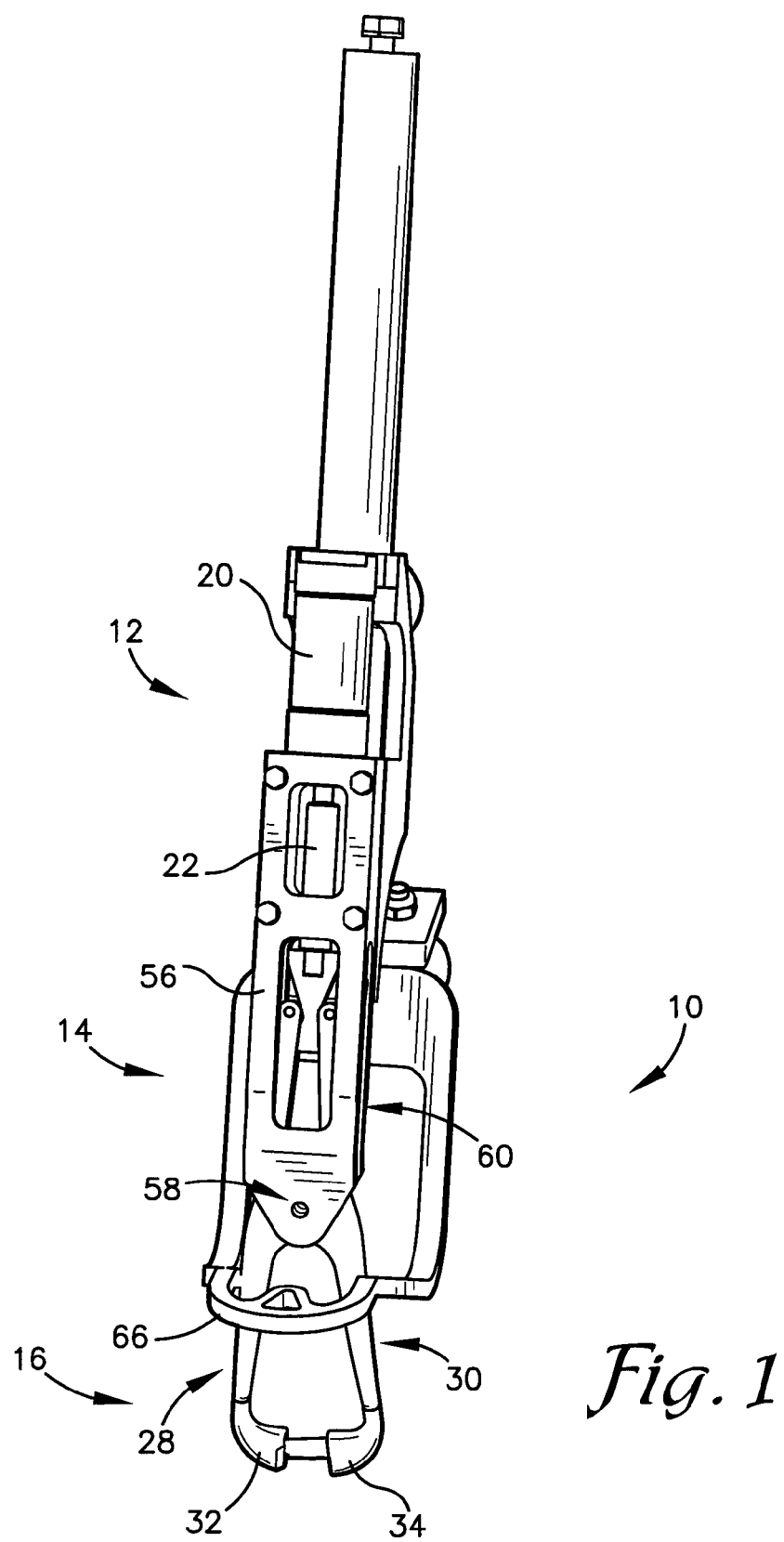
FIG. 1 is a fragmentary isometric view of the device of the present invention.

Broadly, the device 10 comprises an actuator assembly 12; a linkage assembly 14; and a clamping and cutting assembly 16. Referring particularly to FIG. 1, the actuator assembly 12 provides actuation motion which ultimately actuates the clamping and cutting assembly 16. The actuator assembly 12 includes a source 20 and a shaft 22. The source 20 produces the actuation motion. In one embodiment, the source 20 is pneumatic, and the actuation motion is a substantially linear forward and back motion. It will be understood and appreciated, however, that other sources, such as, for example, mechanical sources, and other motions, such as, for example, circular motion, may be used. The shaft 22 transfers the actuation motion to the linkage assembly 14.

Figure 4:
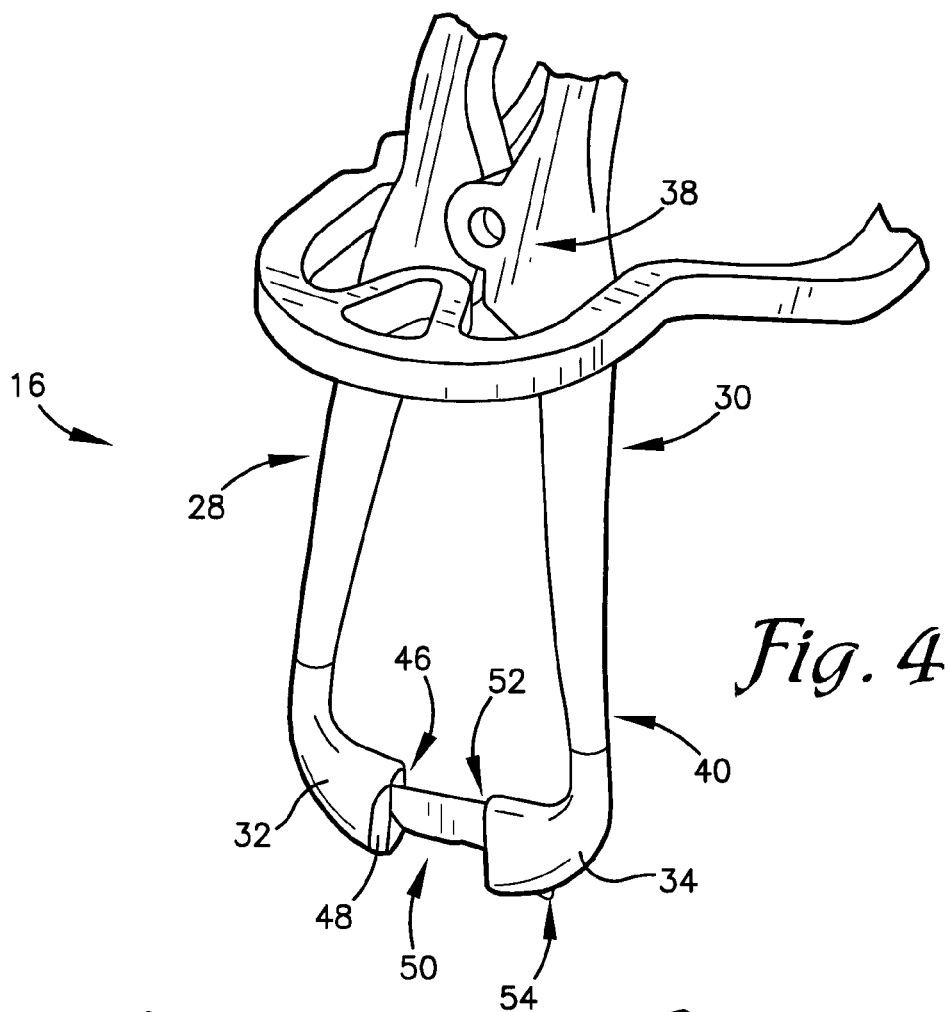
FIG. 4 is a fragmentary isometric view of first and second jaw portions of the clamping and cutting assembly of FIG. 2.

Referring also to FIGS. 2-4, the linkage assembly 14 translates, or conditions, the actuation motion provided by the actuator assembly 12 to accomplish actual actuation of the clamping and cutting assembly 16. The nature of the translation will depend upon a number of factors, including, for example, the type and direction of motion provided by the source 20 and the type and direction of motion needed to accomplish the functionality of the clamping and cutting assembly 16. In one embodiment, the linkage assembly 14 is fixed to an end of the shaft 22 opposite the source 20 of the actuation motion, and presents first and second angled elongated slots 24,26. It will be understood and appreciated, however, that numerous embodiments of the linkage assembly are possible, some relatively simple and some relatively complex, all adapted to perform substantially the same function, i.e., translating the actuation motion to accomplish actual actuation of the clamping and cutting assembly. As such, the present invention is not limited to the particular linkage assembly described and shown herein for accomplishing this function.

The clamping and cutting assembly 16 actuates to substantially simultaneously clamp and cut the esophagus. The clamping and cutting assembly 16 includes opposed first and second arms 28,30 and opposed first and second jaws 32,34. The first and second arms 28,30 transfer the actuation motion from the linkage assembly 14 to the first and second jaws 32,34, respectively. The first and second arms 28,30 each present a first end 36, a second end 38, and an intermediate portion 40. The first end 36 of each arm 28,30 is movably received in a respective angled elongated slot 24,26 of the linkage assembly 14. The second end 40 of each arm 28,30 is removably coupled with a respective jaw 32,34. Such removability allows for removing used jaws for cleaning and, when worn, for replacement. In another embodiment, however, the second end and the respective jaw are a single, non-separable structure. The intermediate portion 38 of each arm 28,30 is pivotably coupled with the intermediate portion 38 of the opposite arm 30,28. In one embodiment, this pivotable coupling includes a bias spring (not shown) adapted to bias the first and second jaws 32,34 to be normally closed.

The first jaw 32 presents a first clamping surface 46, a cutting element 48, and a first portion of a guide element 50. The clamping surface 46 may be provided with any suitable configuration for securing the esophagus, such as, for example, substantially smooth and planar or round, or substantially knurled, toothed, corrugated or otherwise non-smooth and planar (such as in FIGS. 5 and 6) or round. The cutting element 48 may also be provided with any suitable configuration for cutting the esophagus, such as, for example, a beveled edge, a slicing projection, a penetrating projection, or a plurality of penetrating projections, i.e., teeth or other serrations. In one embodiment, the cutting element separates the esophagus into at least two distinct parts. In another embodiment, the cutting element scores, perforates, or otherwise weakens the esophagus for subsequent separation in a predictable location into at least two distinct parts. For example, the cutting element may take the configuration of a plurality of teeth which sufficiently perforate the esophagus such that, when the clamping and cutting assembly retracts, as described below, the esophagus is pulled apart at the perforation. As used herein, unless otherwise noted, the term "cut" encompasses both separating and weakening for subsequent separation. The first portion of the guide element 50 cooperates with a second portion of the guide element 50 provided by the second jaw 34 to ensure proper alignment of the jaws 32,34 during clamping and cutting.

The second jaw 34 presents a second clamping surface 52 and the second portion of the guide element 50. Like the first clamping surface 46, the second clamping surface 52 may be provided with any suitable configuration. Furthermore, the first and second clamping surfaces 46,52 may present cooperating structures, such as alternating ridges and valleys (as in FIGS. 5 and 6) or other interlocking structures, to enhance the ability of the cooperating clamping surfaces 46,52 to secure the esophagus. The second portion of the guide element 50 cooperates with the first portion of the guide element 50 provided by the first jaw 46 to ensure proper alignment of the jaws 32,34 during clamping and cutting. In one embodiment, the first portion of the guide element 50 is a recess and the second portion of the guide element 50 is a projection, wherein the recess and projection closely interlock as the projection slides into the recess when the first and second jaws 32,34 come together.

Either or both of the first and second jaws 32,34 may be provided with additional cutting or scraping structures to remove or facilitate the removal of various internal organs. For example, in the embodiment shown in the figures, both the first and second jaws 32,34 are provided with scraping projections 54, called "lung scrapers," for scraping and removing lung tissue as the device 10 is withdrawn from the carcass after clamping and cutting.

Figure 5:
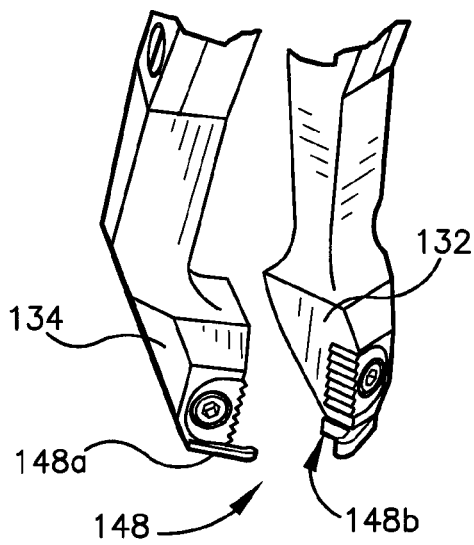
FIG. 5 is a fragmentary isometric view of an alternative embodiment of the clamping and cutting assembly portion of the device of the present invention, wherein the clamping and cutting assembly is shown open.
Figure 6:
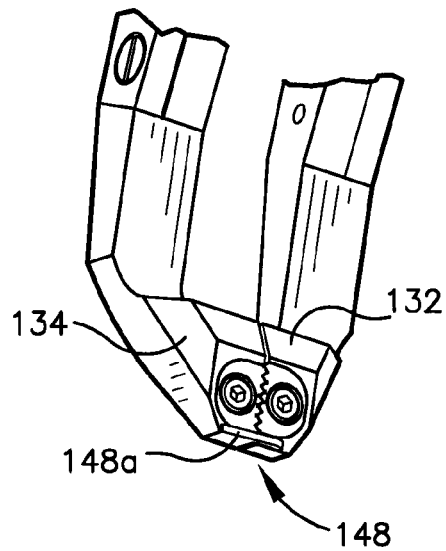
FIG. 6 is a fragmentary isometric view of the alternative embodiment of the clamping and cutting assembly of FIG. 5, wherein the clamping and cutting assembly is shown closed.

In another alternative embodiment, each jaw presents a cutting element or a portion of a cutting element, which separately or cooperatively cut or weaken the esophagus. Referring also to FIGS. 5 and 6, for example, the cutting element 148 may take the form of a slicing blade 148a associated with the second jaw 134 which, when the jaws are closed, is received within a recess 148b associated with the first jaw 132. It will be understood and appreciated that numerous different embodiments of the clamping and cutting assembly are possible, some relatively simple and some relatively complex, all adapted to perform substantially the same function, i.e., substantially simultaneously clamping and cutting, including weakening for subsequent predictable separation, the esophagus at or near the clamped location.

Figure 9:
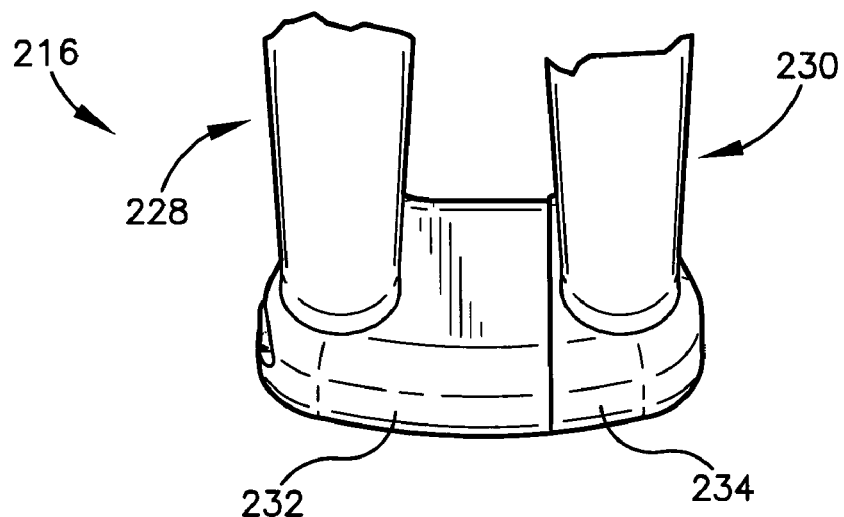
FIG. 9 is a fragmentary isometric view of an alternative embodiment of the clamping and cutting assembly portion of the device of the present invention, wherein the clamping and cutting assembly is shown closed.
Figure 10:
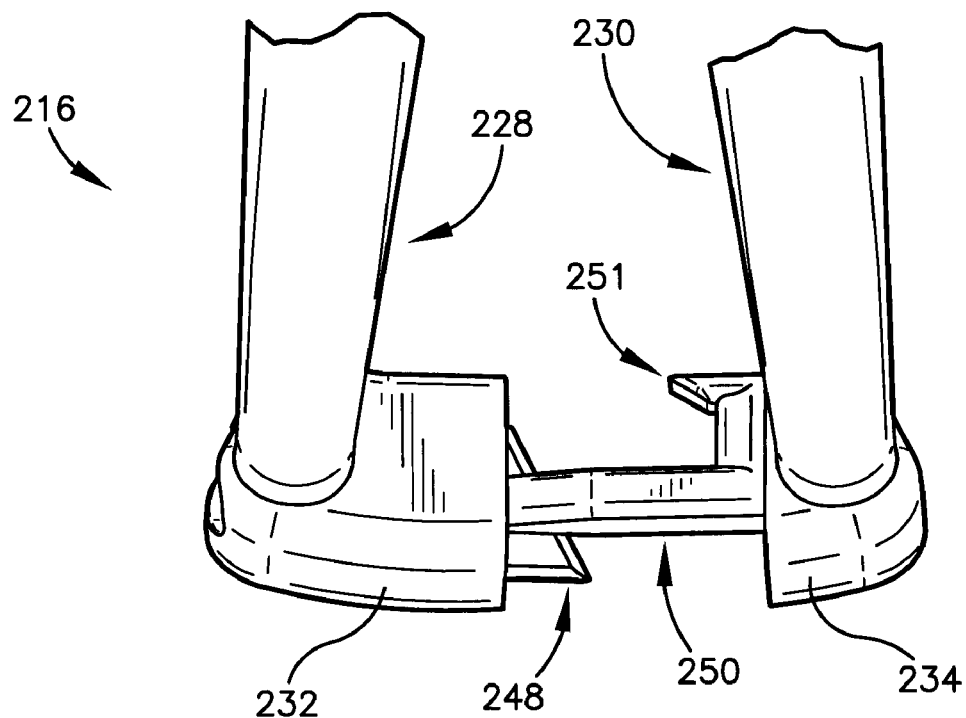
FIG. 10 is a fragmentary isometric view of the alternative embodiment of the clamping and cutting assembly of FIG. 9, wherein the clamping and cutting assembly is shown open.
Figure 11:
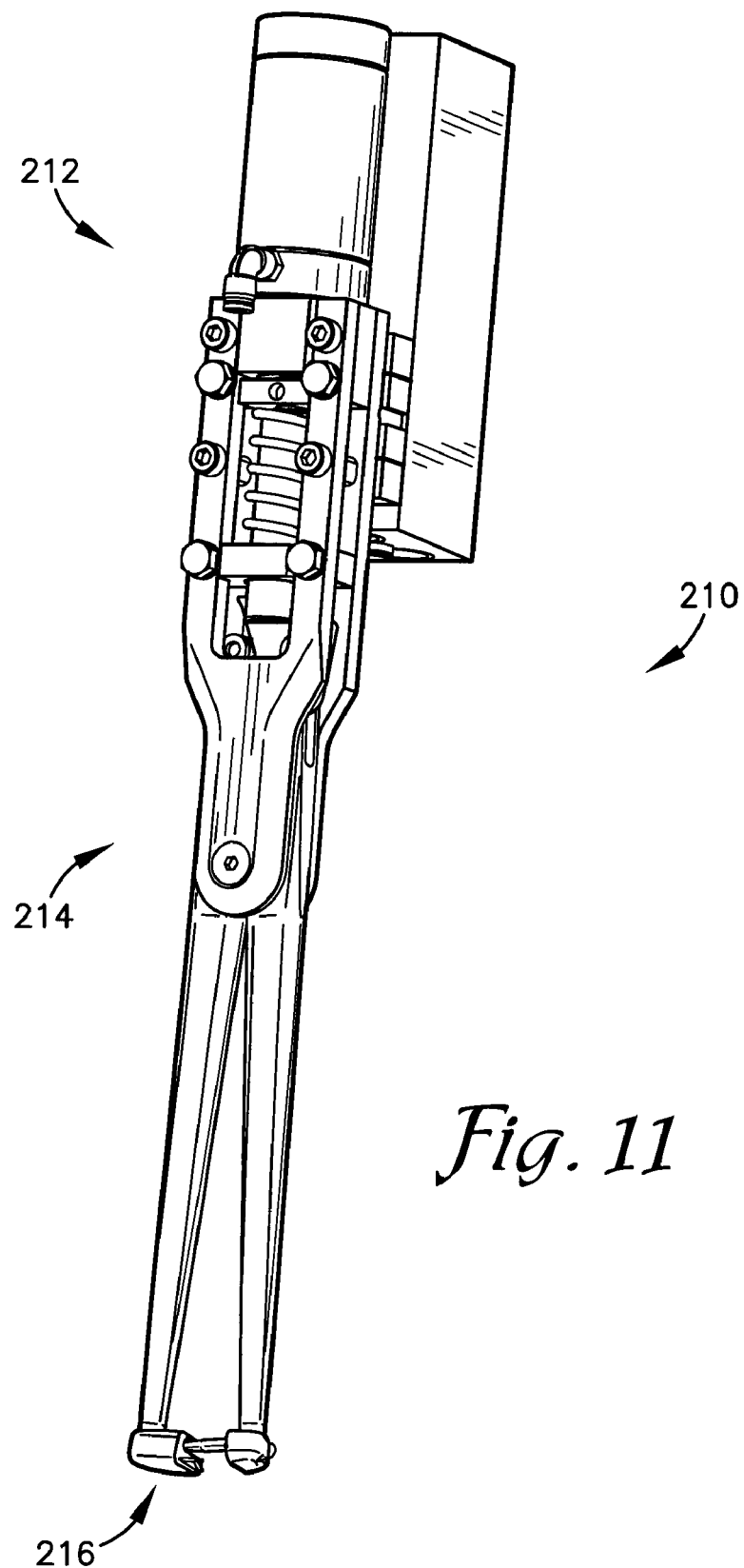
FIG. 11 is a fragmentary isometric view of an alternative embodiment of the device of the present invention incorporating the embodiment of the clamping and cutting assembly shown in FIGS. 9 and 10.

Referring also to FIGS. 9 and 10, for example, another alternative embodiment of the clamping and cutting assembly 216 is shown comprising the opposed first and second arms 228,230; the opposed first and second jaws 232,234; the cutting element 248; the guide element 250; and an edge projection 251. The cutting element 248 is a removable and replaceable blade or similar structure. The edge projection 251 ensures that the esophagus is fully received by the assembly 216 and, once received, is fully maintained within the assembly 216 so as to be fully acted upon. More specifically, the edge projection 251 prevents the esophagus, or a significant portion thereof, from slipping out of the action area of the assembly 216 before being fully acted upon, i.e., before the jaws 232,234 fully close. Referring also to FIG. 11, the assembly 216 is shown incorporated into an alternative embodiment of the device 210, which also includes the actuator assembly 212 and the linkage assembly 214.

In one embodiment, the cutting element may cut, i.e., operably engage the esophagus tissue, slightly before or after the clamping surfaces operably engages the tissue. This last embodiment encompasses, for example, configurations in which the cutting element projects slightly before or slightly behind the clamping surfaces. As such, the present invention is not limited to the particular clamping and cutting assembly described and shown herein for accomplishing this function.

It will be understood and appreciated that the cutting element 48 is, in one embodiment, located forward of the clamping surfaces 46,52 to facilitate the subsequent removal of the internal organs via a rear opening in the carcass, as described below. More specifically, once the esophagus has been clamped and cut, the device 10 retracts, pulling one part of the esophagus and the internal organs out the rear opening while leaving another part of the esophagus and the crop intact within the carcass.

In the embodiment shown in the figures, the device 10 further comprises a support structure 56 adapted to guide or otherwise define the movements of various moving component of the device 10, including, for example, the shaft 22 and the clamping and cutting assembly 16. More specifically, the support structure 56 supports the shaft 22 and limits its movement to what is necessary and sufficient to transfer the actuation motion to the linkage assembly 14. Thus, for example, in one embodiment, the support structure 56 provides one or more openings through which the shaft 22 extends and retracts and which allow the shaft to substantially freely transfer the forward and back actuation motion, but which limit other, undesired movement of the shaft 22. The support structure 56 also supports the first and second arms 28,30 at the pivot coupling 58 at the intermediate portion of each arm 28,30 and about which each arm 28,30 pivots.

Figure 7:
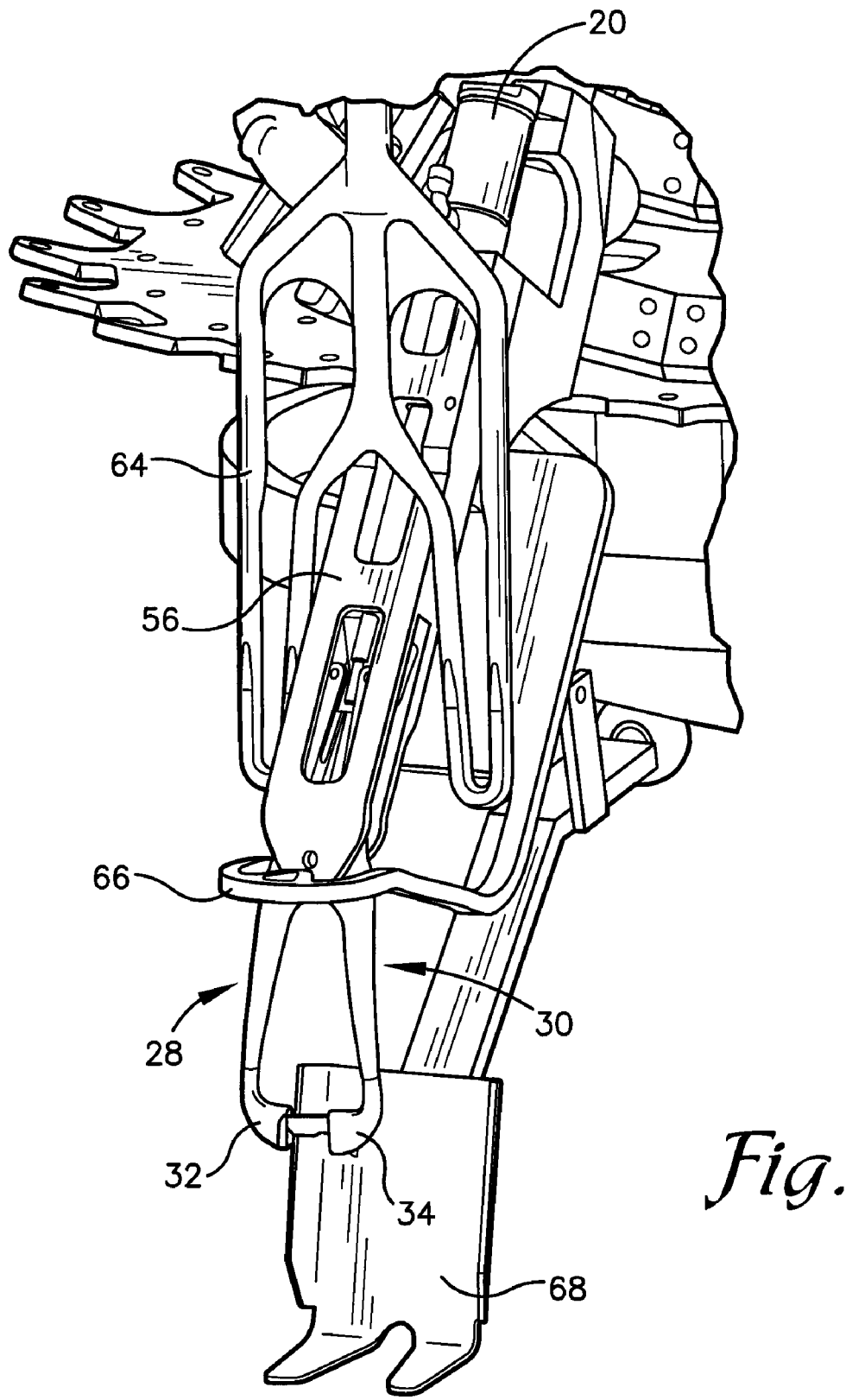
FIG. 7 is a fragmentary isometric view of the device of the present invention shown in use with associated devices, wherein the clamping and cutting assembly is shown open.
Figure 8:
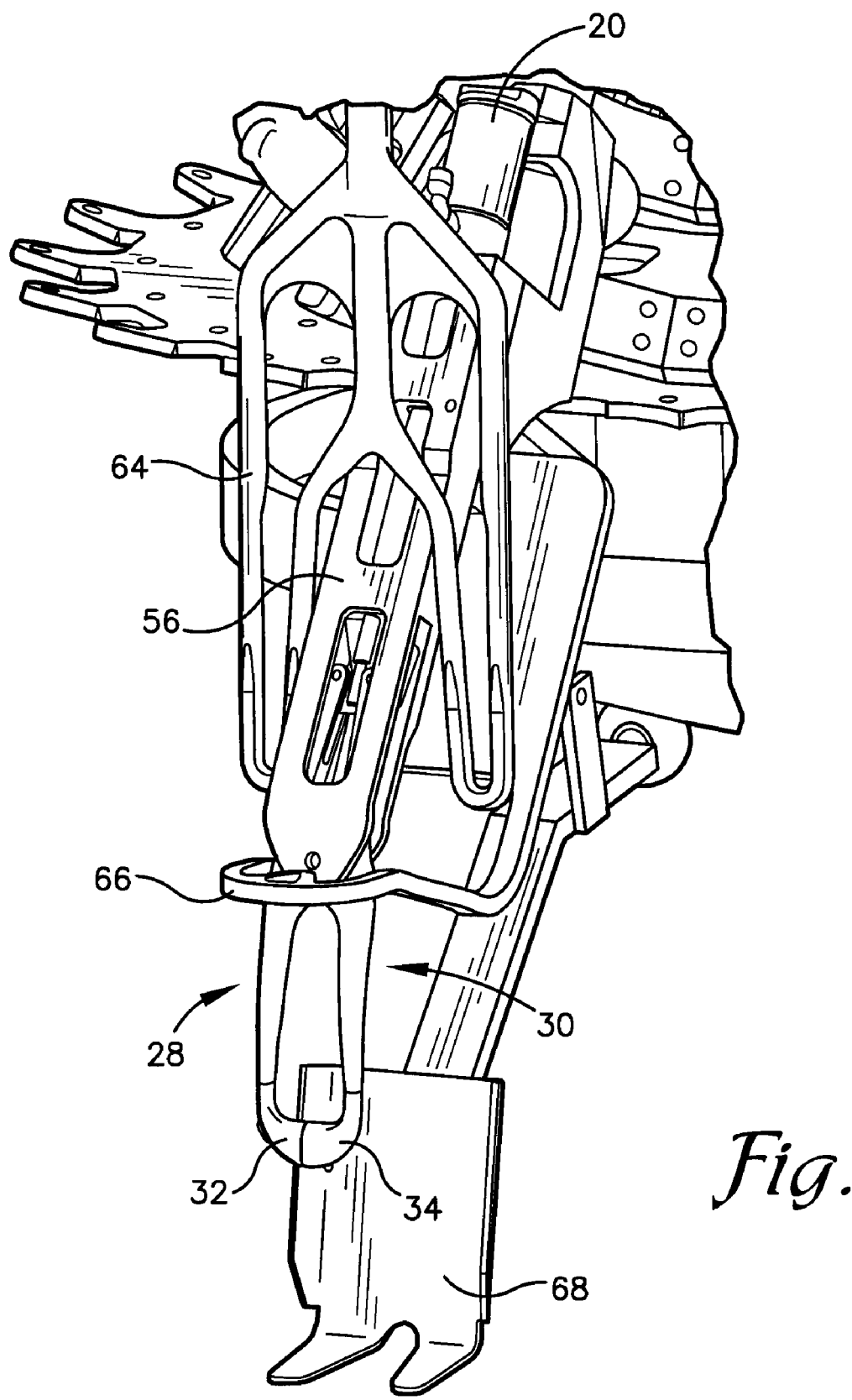
FIG. 8 is a fragmentary isometric view of the device of the present invention shown in use with associated devices, wherein the clamping and cutting assembly is shown closed.

In one embodiment the support structure 56 also supports at least a portion of the linkage structure 14, and provides a channel 60 through which the linkage structure 14 moves while translating the actuation motion to the clamping and cutting assembly 16. In exemplary, but non-limiting, use and operation, the combined clamping and cutting device 10 of the present invention may function as follows. Referring also to FIGS. 7 and 8, the carcass, carried on a shackle 64, which is, in turn, carried on a conveyor or other transporting system, is first placed in position with the rear opening oriented upward and the neck oriented downward. As the shackle 64 moves the carcass into position, a leg loop structure 66 is inserted between the legs of the carcass, and a lower support 68 abuts the carcass. The leg loop 66 both ensures that the rear cavity is and remains sufficiently open to accommodate the first and second arms 28,30 of the device 10, and cooperates with the lower support 68 to minimize movement of the carcass during the clamping and cutting operation. In one embodiment, one or both of the leg loop 66 and lower support 68 are actively moved into position relative to the carcass once the shackle 64 has positioned the carcass; in another embodiment, the leg loop 66 and lower support 68 are fixed and the positioning of the carcass relative thereto is accomplished by the shackle 64.

Once the carcass is properly positioned, the first and second arms 28,30, with the first and second jaws 32,34 open, as shown in FIG. 7, are moved into the carcass through the rear opening and into position relative to the esophagus. The movements required to lower the first and second arms 28,30 into the cavity, avoid various internal organs, and position the first and second jaws 32,34 relative to the esophagus may be accomplished by various drive mechanisms for moving the device 10, the design and operation of which is known to those with ordinary skill in the art. In an alternative embodiment, the device may be substantially immovable and the carcass may be moved relative to the device so as to accomplish the same result.

Once the first and second jaws 32,34 are properly positioned relative to the esophagus, the actuation assembly 12 provides the actuation motion to the linkage assembly 14, the linkage assembly 14 translates the actuation motion for the clamping and cutting assembly 16, and the clamping and cutting assembly 16 actuates to simultaneously clamp and cut the esophagus. More specifically, the source 20 provides the actuation motion, the shaft 22 transfers the actuation motion from the source 20 to the linkage assembly 14, the linkage assembly 14 moves forward such that the first ends 36 of the first and second arms 28,30 move within the first and second elongated slots 24,26 in such a manner as to allow the spring-biased first and second arms 28,30 to pivot about the pivot coupling 50 so as to close the first and second jaws 32,34 upon the esophagus. When the first and second jaws close 32,34, the first and second clamping surfaces 46,52 secure the esophagus, and the cutting element 48 simultaneously cuts the esophagus.

Once the esophagus is clamped and cut, the first and second arms 28,30 are withdrawn from the carcass, pulling a first distinct part of the esophagus, and internal organs attached thereto, out of the carcass through the rear opening, while leaving a second distinct part of the esophagus, and the crop attached thereto, within the carcass for subsequent removal through the neck.

From the preceding description, it will be understood and appreciated that the present invention provides a number of advantages, including, for example, allowing for quickly and efficiently removing an internal organ from the carcass while avoiding pulling apart the crop and the resulting contamination of the carcass. It is roughly estimated that approximately between 20% and 50% of crops are pulled apart using prior art machinery, compared to a target of approximately between 1% and 2% for the present invention.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. In a device for processing a carcass, the improvement comprising:
a clamping and cutting assembly including—
a first clamping surface and a second clamping surface for cooperatively securing an esophagus within the carcass, and
a cutting element for cutting the esophagus,
wherein the first and second clamping surfaces and the cutting element substantially simultaneously secure and cut the esophagus.

2. The device as set forth in claim 1, wherein the carcass is a poultry carcass.

3. The device as set forth in claim 1, wherein the cutting element separates the esophagus at a particular location into at least two distinct parts.

4. The device as set forth in claim 1, wherein the cutting element weakens the esophagus at a particular location so that, when the esophagus is subsequently pulled, the esophagus separates at the particular location into at least two distinct parts.

5. The device as set forth in claim 1, wherein the clamping and cutting assembly further includes a guide element for aligning the first clamping surface and the second clamping surface.

6. A device for processing a carcass, the device comprising:
an actuator assembly for providing an actuation motion;
a linkage assembly coupled with the actuator assembly for receiving and translating the actuation motion; and
a clamping and cutting assembly coupled with the linkage assembly for receiving the translated actuation motion and, in response thereto, actuating to substantially simultaneously secure and cut an esophagus within the carcass, the clamping and cutting assembly including—
a first clamping surface and a second clamping surface for cooperatively securing the esophagus, and
a cutting element for cutting the esophagus,
wherein the first and second clamping surfaces and the cutting element substantially simultaneously secure and cut the esophagus.

7. The device as set forth in claim 6, wherein the actuator assembly includes a source for producing the actuation motion and a shaft for transferring the actuation motion to the linkage assembly.

8. The device as set forth in claim 7, wherein the source is pneumatic, and the actuation motion is a substantially linear motion.

9. The device as set forth in claim 6, wherein the linkage assembly presents a first angled slot and a second angled slot.

10. The device as set forth in claim 9, wherein the clamping and cutting assembly includes—
a first arm having a first end movably coupled with the first angled slot so as to receive the translated actuation motion, and a second end associated with the first clamping surface; and
a second arm having a first end movably coupled with the second angled slot, and a second end associated with the second clamping surface,
wherein movement of the first end of the first arm within the first angled slot, and movement of the first end of the second arm within the second angled slot, results in the first clamping surface and the second clamping surface moving together and apart.

11. The device as set forth in claim 6, wherein the cutting element separates the esophagus at a particular location into at least two distinct parts.

12. The device as set forth in claim 6, wherein the cutting element weakens the esophagus at a particular location so that, when the esophagus is subsequently pulled, the esophagus separates at the particular location into at least two distinct parts.

13. The device as set forth in claim 12, wherein the cutting element includes a plurality of teeth for perforating the esophagus.

14. The device as set forth in claim 6, wherein the clamping and cutting assembly further includes a guide element adapted to align the first clamping surface and the second clamping surface.

15. A device for facilitating the removal of an internal organ from a poultry carcass, the device comprising:
a pneumatic actuator assembly for providing a substantially linear actuation motion;
a linkage coupled with the actuator assembly for receiving and translating the linear actuation motion; and
a clamping and cutting assembly coupled with the linkage assembly for receiving the translated linear actuation motion and, in response thereto, actuating to substantially simultaneously secure and cut an esophagus, the clamping and cutting assembly including—
a first arm movably coupled with the linkage assembly, the first arm presenting a first clamping surface,
a second arm movably coupled with the linkage assembly, the second arm presenting a second clamping surface, wherein the first clamping surface and the second clamping surface cooperatively secure the esophagus,
a cutting element for cutting the esophagus, wherein the first and second clamping surfaces and the cutting element substantially simultaneously secure and cut the esophagus, and
a guide element for aligning the first clamping surface and the second clamping surface.

16. The device as set forth in claim 15, wherein the cutting element separates the esophagus at a particular location into at least two distinct parts.

17. The device as set forth in claim 15, wherein the cutting element weakens the esophagus at a particular location so that, when the esophagus is subsequently pulled, the esophagus separates at the particular location into at least two distinct parts.

18. A method of cutting an esophagus in a carcass so as to facilitate subsequent removal of an internal organ from the carcass, the method comprising the steps of:
(a) securing the esophagus between a first clamping surface and a second clamping surface; and
(b) cutting the esophagus substantially simultaneously with step (a).

19. The method as set forth in claim 18, wherein step (b) includes separating the esophagus at a particular location into at least two distinct parts.

20. The method as set forth in claim 18, wherein step (b) includes weakening the esophagus at a particular location so that, when the esophagus is subsequently pulled, the esophagus separates at the particular location into at least two distinct parts.

* * * * *